May 16, 1933.  H. C. MEYER  1,909,300
TYING MACHINE
Filed July 30, 1932  3 Sheets-Sheet 3
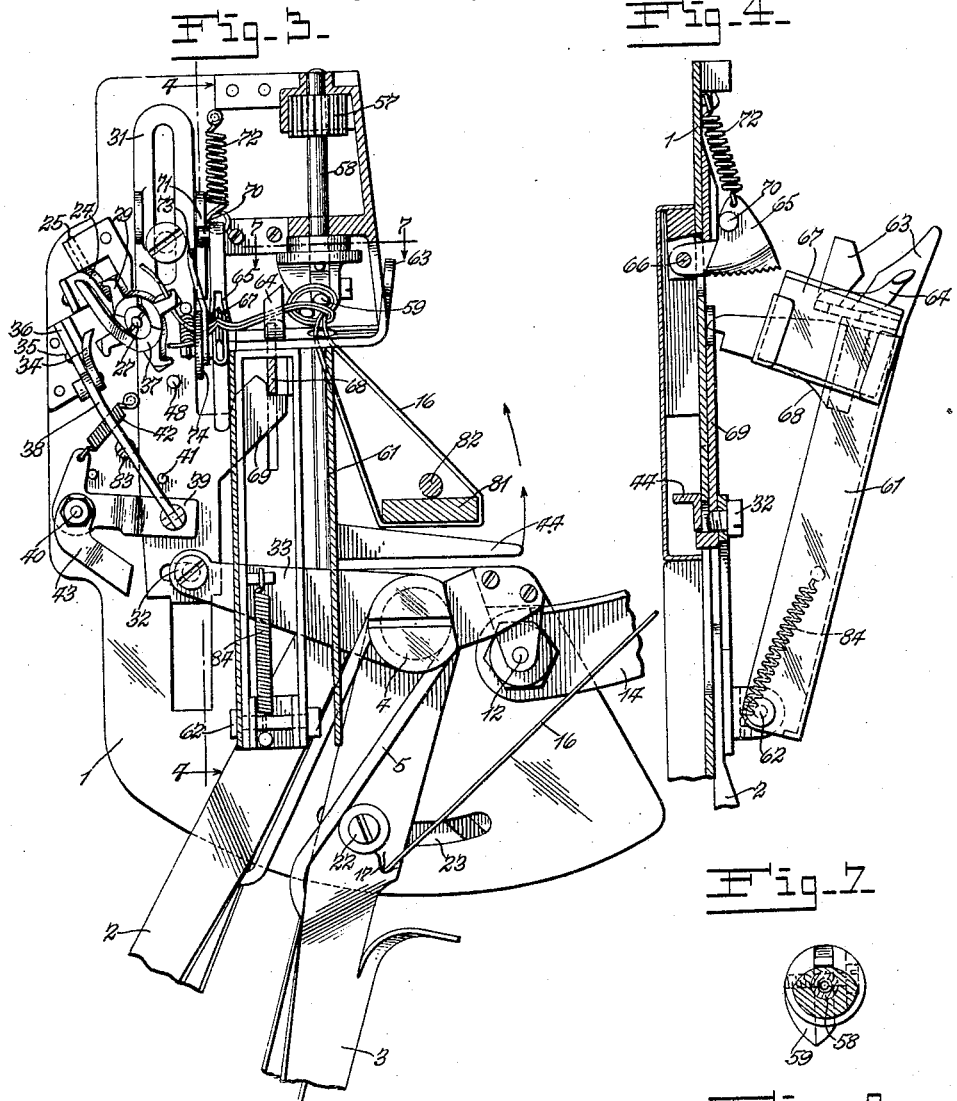
Inventor
Henry C. Meyer
by Rippey & Kingsland
His Attorneys.

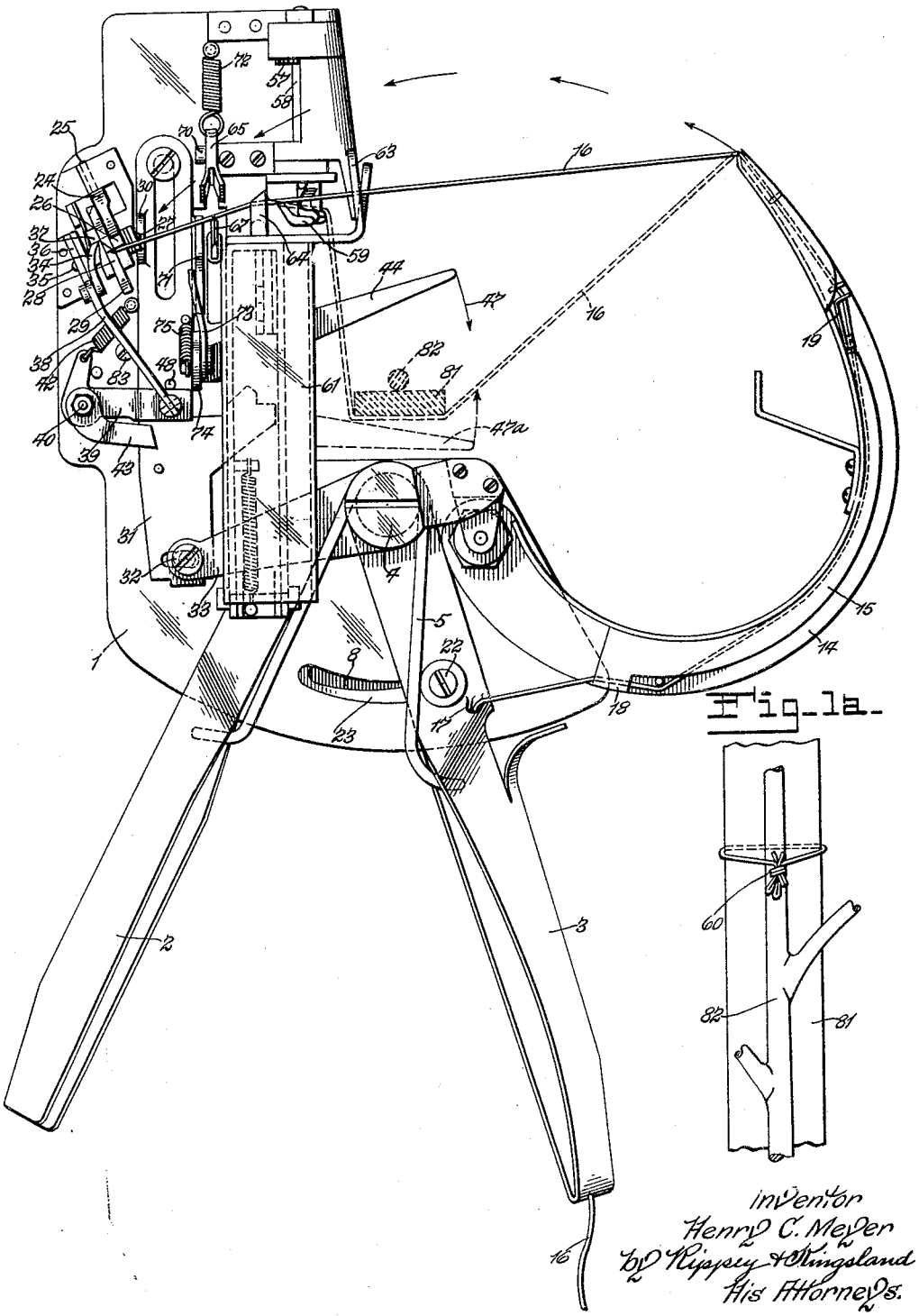

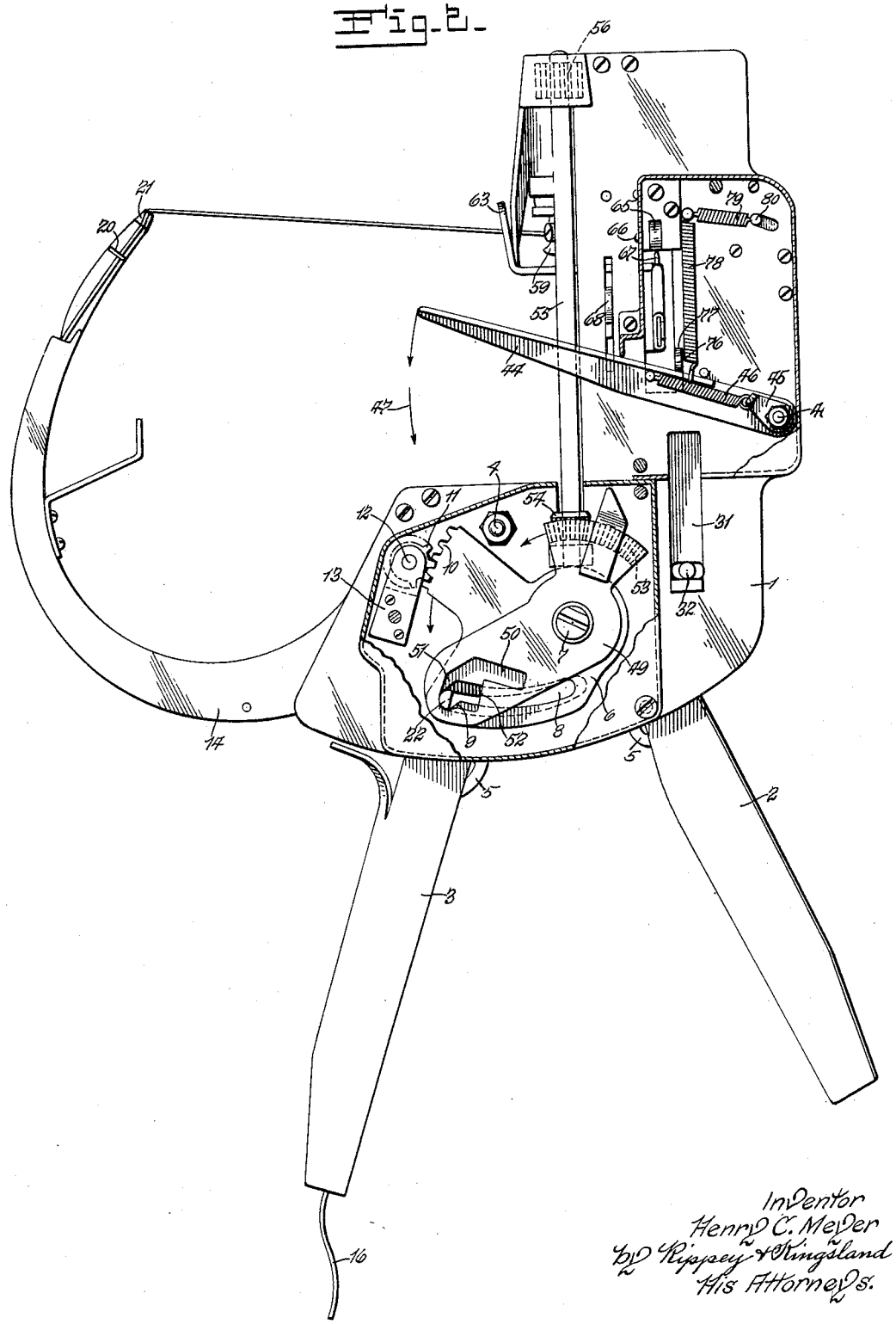

Patented May 16, 1933

1,909,300

UNITED STATES PATENT OFFICE

HENRY C. MEYER, OF ST. LOUIS COUNTY, MISSOURI

TYING MACHINE

Application filed July 30, 1932. Serial No. 627,024.

This invention relates to tying machines for use in tying twine or the like around vines and supports for the vines in order to support the vines for proper growth and development.

An object of the invention is to provide an improved portable and manually operable tying machine constructed with a pair of handles supporting tying and cutting devices, and also supporting a pivoted arm operatively connected with one of the handles, whereby pressure and movement of said one handle toward the other will move said arm to position to place the twine in connection with the cutting and tying devices or adjacent thereto for operation of said devices to tie the twine around the support and the vine.

Another object of the invention is to provide an improved portable tying machine embodying a catch or holder for holding the twine extended across the space between the pivoted arm and the remaining mechanism so that, when the twine extending across said space is pressed inwardly by the vine support and vine, the arm may be moved toward the cutting and tying mechanism, thereby extending the twine around the support and vine and causing operation of the tying mechanism to tie the twine and causing operation of the cutting mechanism to sever the twine.

Another object of the invention is to provide an improved machine of the character and for the purpose mentioned that is accurate and precise in its operations; that may be manufactured and sold at costs and prices making the machine available to those desiring such machines; and that is durable and lasting and easily capable of repair and replacement of parts that may become damaged or broken.

Other objects of the invention will appear from the following description, reference being made to the accompanying drawings, in which—

Fig. 1 is a top plan view of my improved tying machine showing, in solid lines, the parts in the positions they occupy when the machine is ready for operation to tie the twine around a support, and showing, in dotted lines, the position of the support and vine within the machine preparatory for operation of the machine to tie the twine around said support and vine.

Fig. 1ª is a view showing a piece of twine as tied by this machine around a support and vine.

Fig. 2 is a view showing the opposite side of the machine, a part of the casing being removed and casing walls shown in section.

Fig. 3 is an enlarged detail view with parts in section showing the positions of parts of the machine during operation of the tying mechanism.

Fig. 4 is a detail sectional view approximately on the line 4—4 of Fig. 3.

Fig. 5 is a side elevation of the holder that engages and holds the twine preparatory for operation of the tying mechanism.

Fig. 6 is a sectional view approximately on the line 6—6 of Fig. 5.

Fig. 7 is a detail sectional view of the knotter taken approximately on the line 7—7 of Fig. 3.

Fig. 8 is a similar sectional view taken at right angles to Fig. 7.

The mechanism of the machine is supported by a strong and portable frame plate 1 to which a handle 2 is rigidly secured. A cooperating handle 3 is mounted on a pivot 4 for swinging movements toward and from the handle 2. A spring 5 wound around the pivot 4 has its ends engaging the handles 2 and 3 and will yield to permit movement of the handle 3 toward the handle 2, and then operates to move the handle 3 from the handle 2.

A plate 6 is mounted on a pivot 7 supported by the frame 1 and has therein a slot 8 curving about an axis eccentric to the axis of the pivot 7, and has an angular portion 9 in its outer end. An arcuate rack 10 is formed in connection with the plate 6 and meshes with a pinion 11 on a rotary axle 12 supported by the frame 1 and a cooperating spaced bracket 13. A curved arm 14 is attached to the axle 12 and is formed with a guide channel 15.

The twine 16 extends through the handle 3, through a hole 17 (Fig. 1) in said handle 3, through a guide 18 on the arm 14, thence along the guide channel 15 between said arm 14 and a spring 19 mounted on said arm, and thence through guides 20 and 21 (Fig. 2) near the end of the arm 14, which frictionally hold the end of the twine from retraction.

A pin 22 (Fig. 2) rigid with the handle 3 projects through a slot 23 (Fig. 1) in the frame plate 1 and through the slot 8 in the plate 6, and engages in the angular portion 9 at the outer end of the slot 8 when the handle 3 is held in its starting position by the spring 5. In such position, the pin 22 is against the end of the slot 23, thus limiting extent of movement of the handle 3 from the handle 2.

By this construction and arrangement it is apparent that, when the handle 3 is pressed toward the handle 2, the pin 22 will turn the plate 6 about its axis 7 until the pin 22 leaves the angular slot 9 and enters the slot 8. The slot 8 is concentric with the axis of the pivot 4 so that, when the pin 22 leaves the angular slot 9 and enters the slot 8, no further turning movement is imparted to the plate 6 by said pin 22. However, this turning movement imparted to the plate 6 by the pin 22 is sufficient to swing the arm 14 from the position shown in Fig. 2 to position to engage the end of the twine beyond the guide 21 with the holding device of the machine.

A bracket 24 is mounted on a pivot 25 supported by the frame 1 and is provided with a rigid upstanding clamping finger 26. An axle 27 is supported by the bracket 24 and supports a rotary member 28 provided with four rigid angular arms 29 moved successively to position at the side of the rigid finger 26 so as to cooperate with said finger to clamp the end of the twine therebetween. The axle 27 extends over a cam 30 on a slide 31, and the bracket 24 is thereby supported until the slide 31 is moved a distance sufficient to take the cam 30 from under the axle 27.

The slide 31 is mounted on the frame 1 and has pin-and-slot pivotal connection 32 with an arm 33 rigid with the handle 3 and mounted on the pivot 4 so as to swing about the axis of said pivot. Accordingly, when the handle 3 is moved toward the handle 2 as described, the lever 33 will move the slide 31 toward the end of the frame 1 and will move the cam 30 beyond the axle 27.

A pawl 34 (Figs. 1 and 3) is mounted on a pivot 35 supported by a bracket 36 attached to the frame 1 at the side of the member 28, and said pawl operates on a ratchet wheel 37 in rigid connection with the member 28 in a ratio and relationship to turn said member in a manner to place the four arms 29 alternately and successively alongside of the rigid finger 26. A link 38 has one end pivoted to the pawl 34 and the opposite end pivoted to a lever 39 mounted on a pivot 40 supported by the frame 1. The lever 39 extends over the slide 31 and is spaced from said slide 31 a distance sufficient to permit a pin 41 on said slide to pass under said lever 39 without engaging said lever. A spring 42 connected with the lever 39 and the frame 1 operates to move said lever 39 to its starting position after each movement of said lever to operate the pawl 34.

An abutment member 43 is attached to the pivot 40 and extends at the side of the lever 39 and in the line of movement of the pin 41, so that said abutment 43 will be engaged and moved by said pin 41 unless said abutment is moved out of the line of movement of said pin 41. The pivot 40 is mounted for turning movements. As stated, the abutment 43 is rigid with said pivot 40. A lever 44 is pivoted on said pivot 40 at the side of an arm 45 (Fig. 2), which is rigid with said pivot 40. A spring 46 connects the arm 45 with the lever 44 so that, when said lever 44 is moved in the direction of the arrows 47 (Figs. 1 and 2), the pivot 40 will be turned in a direction and to an extent to move the abutment 43 out of the line of movement of the pin 41 and from the position shown in Fig. 1 to the position shown in Fig. 3. This leaves the pin 41 free to pass under the lever 39 without operating said lever.

However, unless the lever 44 be operated from the position shown in Figs. 1 and 2 and in the direction of the arrows 47 and to the dotted line position 47ᵃ (Fig. 1), the pin 41 will engage the abutment 43 and will thereby operate the lever 39 and the connections therefrom to turn the member 28 a distance sufficient to move one arm 29 from the position to cooperate with the finger 26 and another arm 29 to position to cooperate with the finger 26.

The slide 31 supports a stud 48 which engages the lever 39 on the return movement of the slide 31 and assists the spring 42 in moving said lever 39 to its starting position. This stud 48 also functons to prevent accidental operation of the lever 39, and thereby prevents accidental release of the twine from the holding device described.

A plate 49 (Fig. 2) is mounted for turning movements on the pivot 7 and has therein a slot comprising a part 50 and a part 51 at the connection of which a shoulder 52 is provided. The pin 22 extends into the slot 51 in the idle position of the machine. A segmental rack 53 is supported by the plate 49 and meshes with a pinion 54 attached to a shaft 55 rotatively supported by the frame 1 and having on its outer end a pinion 56 (Fig. 2).

The pinion 56 meshes with a pinion 57 attached to a shaft 58 supporting a knot-tying device 59. This knot-tying device operates in a known manner when the shaft 58 is rotated, so as to engage the doubled ends of the twine 16 as shown in Fig. 3 and tie the knot 60 as shown in Fig. 1ª.

A supporting member 61 is mounted on a pivot 62 for swinging movments toward and away from the frame 1. At the end adjacent to the knot-tying device 59, this supporting member 61 has a bifurcation 63 through which the end of the arm 14 passes when the handle 3 is operated to engage the end of the twine with the holding device comprising the finger 26 and the arms 29. The supporting member 61 also has an arm 64 under which the twine is extended when the arm 14 is retracted from the twine holding device.

A bifurcated member 65 is mounted on a pivot 66 (Fig. 2) and cooperates with a knife 67 attached to the supporting member 61 so as to cut the twine after each knot has been tied. A cam 68 (Figs. 3 and 4) is attached to the supporting member 61 and is engaged by an arm 69 in connection with the slide 31 during the final portion of the movement of said slide from its starting position, shown in Fig. 1, to the position shown in Figs. 3 and 4.

The bifurcated member 65 has a lateral projection 70 which is engaged by a cam 71 on the slide 31 during the final portion of the longitudinal movement of said slide from the position shown in Fig. 1 to the position shown in Figs. 3 and 4. This operation of the cam 71 against the projection 70 swings the bifurcated member 65 toward the knife 67 in opposition to the retracting spring 72.

An arm 73 is pivoted on a bracket 74 in connection with the slide 31 and is upheld by a spring 75, during the final portion of the movement of the slide 31 from the position shown in Fig. 1 to the position shown in Figs. 3 and 4. This arm 73 is extended over the twine 16 that is engaged with the holding device, and is also moved toward the frame 1 so as to hold the twine in position for operation of the cutter and the knotter. This swinging movement of the arm 73 toward the frame 1 is effected by engagement of the tail of an extension 76 of said arm with a shoulder 77 on the frame 1.

A spring 78 moves the lever 44 to its initial or normal position after each operation of said lever, and a spring 79 connected with a pin 80 on the bracket 24 yieldingly supports the bracket in the position in which it is positively supported by the cam 30.

In Figs. 1, 1ª and 3, a support 81 for a vine 82 is shown, and it is the function and duty of this machine to pass the twine about the support 81 and the vine 82 and tie the knot 60 so that the knotted piece of twine will hold the vine in connection with the support.

In operation, the twine being arranged so that it extends through the handle 3 and along the outer guide 15 of the arm 14 and a short distance beyond the guide 21 at the end of said arm 14, the handle 3 is moved toward the handle 2. This swings the arm 14 in a direction and to an extent to place the guide 21 adjacent to the holding device and in position to cause the projecting end of the twine to be engaged between the finger 26 and the arm 29 that is moved by operation of the ratchet 34.

The ratchet 34 is operated by the pin 41 engaging the abutment 43, and thereby operating the lever 39 and the ratchet operating link 38. Extent of movement of the slide 31 is limited by engagement of the lever 39 with an abutment 83 rigid with the frame 1; but there has been sufficient movement of the handle 3 to operate the arm 14 to the extent required and to move the pin 22 into the curved slot 8. As heretofore stated, when the pin 22 enters the curved slot 8, there will be no further movement of the arm 14 by further operation of the handle 3.

Pressure on the handle 3 is then released to a sufficient extent to permit the spring 5 to move the handle 3 from the handle 2, thereby moving the arm 14 to its outward position, shown in Figs. 1 and 2, leaving the twine 16 extending from the guide 21 to the holding device comprising the finger 26 and the cooperating arm 29. The twine extends through the bifurcation 63 adjacent to the knot-tying device 59 below the arm 64, between the knife 67 and the bifurcation 65, and below the arm 73.

Next, the machine is manipulated and pushed so as to cause the support 81 to press the twine 16 to the dotted line position shown in Fig. 1 and to operate the lever 44 in the direction of the arrows 47 to the dotted line position 47ª. This removes the abutment 43 from the line of movement of the pin 41, and thereby conditions the machine for knot-tying and cutting operations by permitting further movement of the handle 3 toward the handle 2. This further movement of the handle 3 toward the handle 2 is necessary in order to impart the required rotation to the knot-tying device 59 and in order to move the bifurcation 65 to cooperative position with respect to the knife 67, and in order to cause the arm 69 to operate against the cam 68 and raise the member 61 in opposition to its returning spring 84. These movements follow in proper sequence so that, when the arm 14 returns to its outward position, the twine has been looped and tied about the support 81 and the vine 82 and is held by the knot 60.

It is then necessary to operate the handle 3 so as to engage the end of the twine with the holding device in the manner shown in Figs. 1 and 2, after which the machine may again be operated by pressing the handle 3 toward the handle 2 in order to loop and tie the twine about the support and vine.

This machine is easily portable and is easily operated by a single hand, and may be constructed and sold at a price making it available for use for many purposes. It is specially useful in tying up tomato vines and other vegetable vines, as well as grape vines and other fruit vines in connection with their supports. A single person, by use of this device, can perform the same amount of work that now requires the services of many persons for the same length of time.

Accordingly, the invention serves all of its intended objects and purposes in a highly efficient and satisfactory manner. It is a genuine convenience for use in tying up vines of various kinds and may be also used for tying packages or bundles. It will be apparent to those skilled in this art that the construction and arrangement of the parts and devices comprised within this invention may be varied widely without departure from the nature and principle thereof. Accordingly, I do not restrict myself in any unessential particulars, but what I claim and desire to secure by Letters Patent is:—

1. A machine of the character described comprising a frame, a handle rigid with the frame, a stationary clamping member in connection with said frame, a rotary clamping member cooperating with said stationary member to engage and hold the end portion of the piece of twine, means for rotating said rotary clamping member, an arm pivoted to said frame, a handle pivoted to said frame for operating said arm to insert the end of twine between said clamping members, and a knotter operated by said pivoted handle for tying the twine.

2. A portable machine of the character described comprising a frame, a holding device supported by said frame for engaging and holding the end of twine, mechanism for operating said holding device to engage the end of twine, mechanism other than said first named mechanism for moving the twine to position to be engaged by said holding device, knot-tying mechanism for tying the twine, and a cutter supported by said frame between said knot-tying mechanism and said holding device.

3. A portable machine of the character described comprising a frame, a holding device supported by said frame for engaging and holding the end of twine, mechanism for operating said holding device to engage the end of twine, mechanism other than said first named mechanism for moving the twine to position to be engaged by said holding device, knot-tying mechanism for tying the twine, a cutter supported by said frame between said knot-tying mechanism and said holding device, and mechanism for operating said cutter to cut the twine during operation of said knot-tying mechanism.

4. A machine of the character described comprising a frame, a holding device supported by said frame for engaging and holding the end of twine, a handle pivoted to said frame, an arm pivoted to said frame, mechanism for operating said arm by said handle to place the twine for engagement by said holding device, connections operated by said handle for operating said holding device to engage the twine, knot-tying mechanism operated by said handle, and a cutter operated by said handle to cut the twine between said knot-tying mechanism and said holder.

5. A machine of the character described comprising a frame, a holding device mounted on said frame for engaging and holding the end of twine, a handle pivoted to said frame, an arm pivoted to said frame, mechanism for operating said arm by said handle to place the end of twine for engagement by said holding device, mechanism operated by said handle for operating said holding device to engage and release the twine, and knot-tying mechanism operated by said handle for tying the twine.

6. A machine of the character described comprising a frame, a holding device mounted on said frame for engaging and holding the end of twine, a handle pivoted to said frame, an arm pivoted to said frame, mechanism for operating said arm by said handle to place the end of twine for engagement by said holding device, mechanism operated by said handle for operating said holding device to engage and release the twine, knot-tying mechanism operated by said handle for tying the twine, a cutter supported by said frame, and means for operating said cutter by said handle as an incident to the first operation of said arm by said handle after said arm has been operated to engage the twine with said holding device.

7. A machine of the character described comprising a frame, a holding device mounted on said frame for engaging and holding the end of twine, a handle pivoted to said frame, an arm pivoted to said frame, mechanism for operating said arm by said handle to engage the end of twine with said holding device, mechanism operated by said handle for operating said holding device to engage and release the twine, knot-tying mechanism operated by said handle for tying the twine, a cutter supported by said frame, means for operating said cutter by said handle as an incident to the first operation of said arm by said handle after said arm has been operated to engage the twine with said holding device, and a cutting device operated by said handle during said second operation of said handle to cut the twine between said knot-tying mechanism and said holding device.

8. A machine of the character described comprising a frame, a holding device supported by said frame for engaging and holding the end of twine, a handle pivoted to said frame, an arm pivoted to said frame, mechanism for operating said arm by said handle to move the twine to position to be engaged by said holding device, mechanism operated by said handle for operating said holding device to engage the twine when said arm is operated by said handle as aforesaid, knot-tying mechanism supported by said frame, mechanism for operating said knot-tying mechanism by said handle, and a lever supported by said frame controlling operation of said knot-tying mechanism by said handle.

9. A machine of the character described comprising a frame, a holding device supported by said frame for engaging and holding the end of twine, a handle pivoted to said frame, an arm pivoted to said frame, mechanism for operating said arm by said handle to move the twine to position to be engaged by said holding device, mechanism operated by said handle for operating said holding device to engage the twine when said arm is operated by said handle as aforesaid, knot-tying mechanism supported by said frame, mechanism for operating said knot-tying mechanism by said handle, a cutting device supported by said frame between said knot-tying mechanism and said holding device, connections for operating said cutting mechanism by said handle, and a lever supported by said frame controlling operation of said knot-tying mechanism and said cutting device by said handle.

10. A machine of the character described comprising a frame, a holding device supported by said frame for engaging and holding and releasing twine, an arm pivoted to said frame, a handle pivoted to said frame, knot-tying mechanism supported by said frame, a cutting device supported by said frame between said knot-tying mechanism and said holding device, and connections operated by said handle for operating said arm, said holding device, said knot-tying mechanism and said cutting device, respectively.

11. A machine of the character described comprising a frame, a holding device supported by said frame for engaging and holding and releasing twine, an arm pivoted to said frame, a handle pivoted to said frame, knot-tying mechanism supported by said frame, a cutting device supported by said frame between said knot-tying mechanism and said holding device, connections operated by said handle for operating said arm, said holding device, said knot-tying mechanism and said cutting device, respectively, and a lever pivotally supported by said frame and controlling operation of said knot-tying mechanism and said cutting device by said handle.

12. A machine of the character described comprising a frame, a holding device supported by said frame for engaging and holding and releasing twine, an arm pivoted to said frame, a handle pivoted to said frame, knot-tying mechanism supported by said frame, a cutting device supported by said frame between said knot-tying mechanism and said holding device, connections operated by said handle for operating said arm, said holding device, said knot-tying mechanism and said cutting device, respectively, a lever pivotally supported by said frame, and means operative by said lever controlling operation of said knot-tying mechanism and said cutting device by said handle.

13. In a machine of the character described, a frame, a manually operative handle pivoted to said frame, a finger rigidly supported by said frame, a rotary device cooperative with said finger to engage and release twine, mechanism operative by said handle for moving twine to position to be engaged and held between said rotary device and said finger, mechanism operative by said handle for rotating said rotary device, and a lever pivotally supported by said frame controlling operation of said mechanism by said handle.

14. In a machine of the character described, a frame, a manually operative handle pivoted to said frame, a finger rigidly supported by said frame, a rotary device cooperative with said arm to engage and release twine, mechanism operative by said handle for moving twine to position to be engaged and held between said rotary device and said finger, mechanism operative by said handle for rotating said rotary device, knot-tying mechanism supported by said frame for operation by said handle, a cutting device supported by said frame for operation by said handle, connections for operating said knot-tying mechanism and said cutting device, respectively, by said handle, and a lever controlling operation of said connections by said handle.

15. A machine of the character described comprising a portable frame, a holding device supported by said frame operative to engage and hold and release twine, knot-tying mechanism supported by said frame for tying knots in the twine, a cutting device supported by said frame between said holding device and said knot-tying mechanism, an arm pivotally supported by said frame, a handle pivotally supported by said frame, mechanism for operating said arm by said handle to move the twine to position to be engaged by said holding device, connections for operating said knot-tying mechanism and said cutting device, respectively, by said handle, and a lever pivotally supported by said frame and controlling operation of said knot-tying mechanism and said cutting device by said handle.

16. A machine of the character described comprising a portable frame, a holding device supported by said frame operative to engage and hold and release twine, knot-tying mechanism supported by said frame for tying knots in the twine, a cutting device supported by said frame between said holding device and said knot-tying mechanism, an arm pivotally supported by said frame, a handle pivotally supported by said frame, mechanism for operating said arm by said handle to move the twine to position to be engaged by said holding device, connections for operating said knot-tying mechanism and said cutting device, respectively, by said handle, a lever pivotally supported by said frame and controlling operation of said knot-tying mechanism and said cutting device by said handle, and means controlled by said lever controlling operation of said holding device to engage and release twine.

17. A machine of the character described comprising a portable frame, a holding device supported by said frame for engaging and holding twine, knot-tying mechanism supported by said frame for knotting the twine, a cutting device supported by said frame for cutting the twine between said knot-tying mechanism and said holding device, a pivoted arm supported by said frame for moving the twine into engagement with said holding device and to position to be engaged and tied by said knot-tying mechanism, and a pivoted lever supported by said frame controlling operation of said knot-tying mechanism and said cutting device by said handle.

18. A machine of the character described comprising a portable frame, a holding device supported by said frame for engaging and holding twine, knot-tying mechanism supported by said frame for knotting the twine, a cutting device supported by said frame for cutting the twine between said knot-tying mechanism and said holding device, a pivoted arm supported by said frame for moving the twine into engagement with said holding device and to position to be engaged and tied by said knot-tying mechanism, a pivoted lever supported by said frame controlling operation of said knot-tying mechanism and said cutting device by said handle, and means operative by said lever controlling operation of said holding device by said handle to engage and release twine.

HENRY C. MEYER.